US008555181B2

(12) United States Patent  
Thorpe et al.

(10) Patent No.: US 8,555,181 B2  
(45) Date of Patent: Oct. 8, 2013

(54) METHOD AND SYSTEM FOR CONSTRUCTING BUSINESS RULES IN A BUSINESS SOFTWARE SYSTEM USING INTELLIGENT TILES

(75) Inventors: David Thorpe, Portland, OR (US); Michael Keith Lemmon, Portland, OR (US); Gretchen Almy McNeely, Portland, OR (US); Scott J. Mount, Oswego, OR (US); Steven R. Wigginton, Citrus Heights, CA (US); Craig D. Hanson, Elk Grove, CA (US)

(73) Assignee: Amdocs Software Systems Limited, Dublin (IE)

( * ) Notice: Subject to any disclaimer, the term of this patent is extended or adjusted under 35 U.S.C. 154(b) by 480 days.

(21) Appl. No.: 12/862,604

(22) Filed: Aug. 24, 2010

(65) Prior Publication Data

US 2011/0302526 A1 Dec. 8, 2011

Related U.S. Application Data

(60) Provisional application No. 61/352,573, filed on Jun. 8, 2010.

(51) Int. Cl.  
*G06F 3/048* (2013.01)

(52) U.S. Cl.  
USPC .......................................... 715/763; 715/769

(58) Field of Classification Search  
USPC .......................................... 715/788, 769, 763  
See application file for complete search history.

(56) References Cited

U.S. PATENT DOCUMENTS

| 7,836,427 | B1 * | 11/2010 | Li et al. ........................ 717/117 |
| 2005/0192839 | A1 * | 9/2005 | St. Jacques et al. ............. 705/2 |
| 2011/0029864 | A1 * | 2/2011 | Stewart et al. ............... 715/702 |

OTHER PUBLICATIONS

Hanson et al., U.S. Appl. No. 12/862,550, filed Aug. 24, 2010, for "Customer Care Support System with Call Avoidance Processing" (30 pages).
Bailin et al., U.S. Appl. No. 12/883,879, filed Sep. 16, 2010, for "Method and System for Configuring Rules for Execution" (45 pages).

* cited by examiner

*Primary Examiner* — Omar Abdul-Ali  
(74) *Attorney, Agent, or Firm* — Finnegan, Henderson, Farabow, Garrett & Dunner LLP

(57) ABSTRACT

Methods and systems for constructing rules enable a simultaneous display of multiple windows on a display screen of a computer system. The multiple windows include a first window configured as a library and a second window configured as a canvas. Custom configuration of tiles in the library is enabled, and each tile corresponds to a term. Further, selection of the tiles from the library for placement in the canvas is enabled, and the placement reflects a logical statement, which corresponds to one or more instructions capable of being executed by a computer to perform a business function.

21 Claims, 5 Drawing Sheets

METHOD AND SYSTEM FOR CONSTRUCTING BUSINESS RULES IN A BUSINESS SOFTWARE SYSTEM USING INTELLIGENT TILES

RELATED APPLICATIONS

This application claims the benefit of priority of U.S. Provisional Application No. 61/352,573, filed Jun. 8, 2010, entitled "Method and System for Constructing Business Rules in a Business Software System Using Intelligent Tiles," which is incorporated in its entirely herein by reference.

BACKGROUND

1. Field

This disclosure relates generally to rule configuration in computer systems, and more particularly, to methods and systems for allow business analysts to create and modify business rules in a computer system using intelligent tiles.

2. Background

It is desirable to establish a user interface for the creation of business rules. The user interface may humanize the language and interactions, allow for flexible construction of rules, and guide a user to be specific enough for explicate definition used by some computer systems.

SUMMARY

Methods and systems consistent with aspects of the present invention provide a computer-implemented rule construction method for configuring rules in a computer system having a memory and a display screen. The method enables simultaneous display of multiple windows on the display screen, the multiple windows including a first window configured as a library and a second window configured as a canvas. The method enables custom configuration of tiles in the library, each tile corresponding to a term, and enables selection of the tiles from the library for placement in the canvas, wherein the placement reflects a logical statement.

Additional methods and systems consistent with aspects of the present invention provide a rule construction system for configuring rules, comprising a memory; a display screen configured to enable simultaneous display of multiple windows on the display screen, the multiple windows including a first window configured as a library and a second window configured as a canvas; a library configuration component configured to enable custom configuration of tiles in the library, each tile corresponding to a term; and a placement component configured to enable selection of the tiles from the library for placement in the canvas, wherein the placement reflects a logical statement.

Further, other methods and systems consistent with aspects of the present invention provide a computer-implemented rule construction method for configuring a business rule for a customer's bill payment pattern in a computer system having a memory and display. The computer-implemented rule construction method enables simultaneous display of multiple windows on the display screen, the multiple windows including a first window configured as a library and a second window configured as a canvas; enables custom configuration of tiles in the library, each tile corresponding to a business term; and enables selection of a first tile and a second tile from the library for placement in the canvas, wherein the placement reflects a configuration of the business rule for the customer's bill payment pattern.

DETAILED DESCRIPTION

The creation of business rules (e.g., data-driven or goal-oriented rules) in business software systems can be a complex process. Yet, some systems make it difficult for business analysts to write business rules. For example, some systems require business rules to be expressed in a natural form that is not compatible with computer systems, or in the pure logic of a programming language.

It is therefore desirable to establish an effective user interface for business analysts to write rules. Such an effective user interface may help to humanize interactions between a user and a system, allow for flexible construction of rules, and yet enable the user to create rules that are specific enough for the explicate definition that may be needed by computer systems.

An intelligent tiles rule construction system consistent with the present invention allows for plain language construction of rules with friendly naming and a reduced use of symbols. The construction and review of rules may be performed in a manner familiar to English (e.g., natural language) definitions found in a dictionary. Of course, it is understood that rules may be constructed in any language, for example a language chosen by a user. An intelligent tiles rule interface allows users to start wherever they want in a rule definition, and offers freeform collection, note taking, and live validation of rules.

Reference will now be made in detail to exemplary aspects of the invention, examples of which are illustrated in the accompanying drawings. Wherever possible, the same reference numbers will be used throughout the drawings to refer to the same or like parts.

Figure 1:
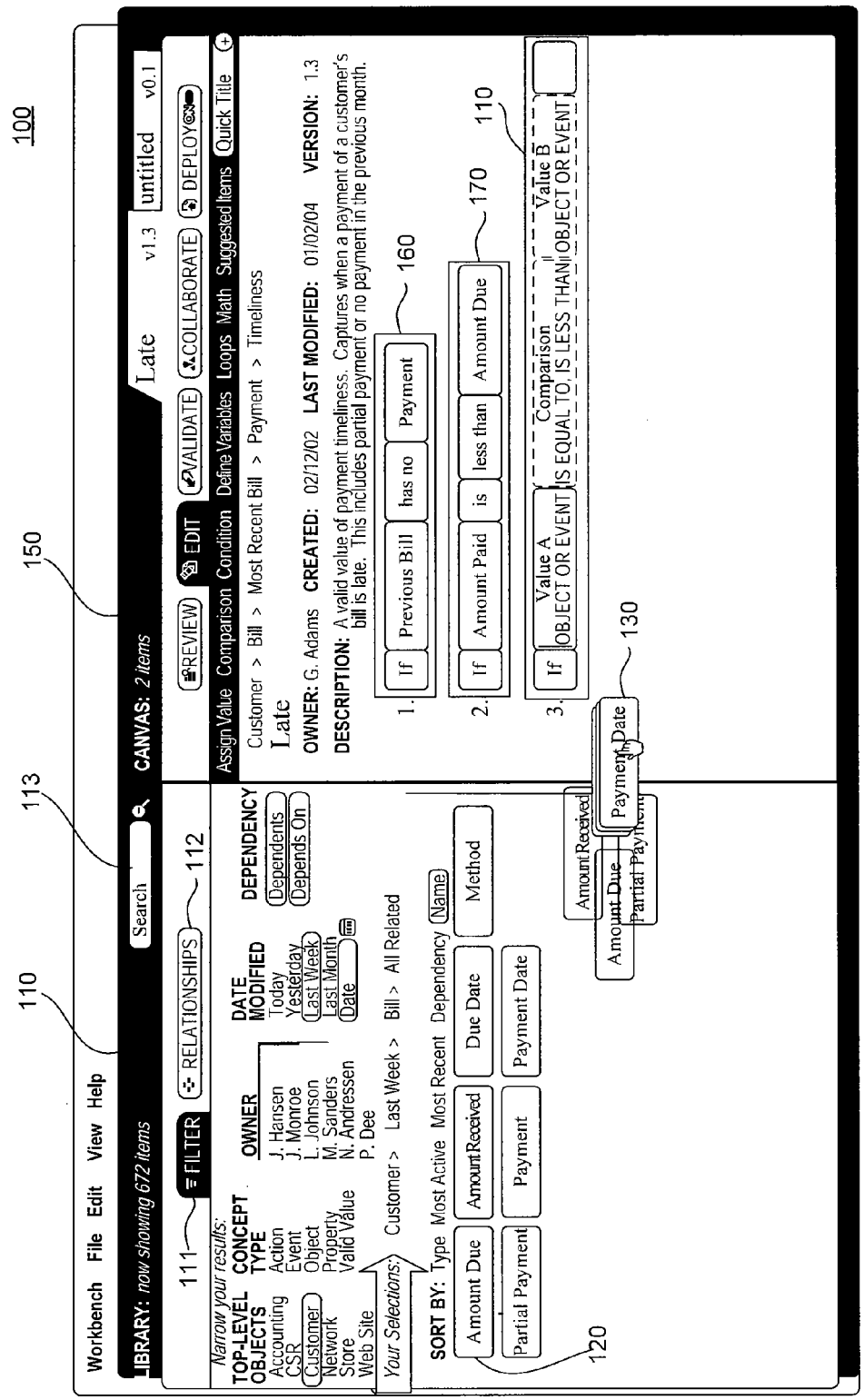
FIG. 1 is a diagram of a user interface for creating a business rule using a tile library in accordance with one implementation consistent with the present invention.

FIG. 1 is a diagram of a user interface for creating a business rule using a tile library in accordance with one implementation of the present invention. As shown in FIG. 1, a user interface 100 may include a library 110 and a canvas 150. Library 110 may include a "filter" function button 111 and a "relationships" function button 112, as well as a search function button 113. "Search" function button 113 corresponds to a software-implemented operation that allows a user to search for objects, such as accounting, customer, network, store, or website concepts, for example, or for concept types, such as actions, events, property, etc. Filter function button 111 corresponds to a software-implemented operation that allows a user to search by owner, date modified, and dependency, and to sort and narrow results of the search. Relationships function button 112 corresponds to a software-implemented operation that allows for viewing, creating, or modifying maps of relationships between concepts or tiles.

Library 110 includes tiles, such as "Amount Due" tile 120. A tile may include a word or set of words contained by a boundary. The words may be grouped to create a natural language label, e.g., "Amount Due" as shown in tile 120. The natural language label is a humanized view of a specific concept. Although a tile may use a natural language label, the tile may also be associated with a uniquely named distinct element for use in the construction of rules. Tiles may represent object properties, valid values, or elements of a computer programming language. Labels on the tiles need not be unique, but the concepts that the labels represent have a fully qualified unique identifier. Tile concepts may represent business concepts (e.g., objects or properties).

A user may create tiles by typing a known natural language label. When there is ambiguity of natural language labels, the system may allow the user to resolve which specific concept the user wants to use. If a label for a tile is not in library 110, then a user may be prompted to create a new business concept, or associate an existing concept to a new tile.

If a tile represents a business concept, the tile may have an associated, fully qualified data path, which is hidden, and which distinctly identifies the tile's object and property. The data path name may be revealed to the user to resolve ambiguous nicknames.

As shown in FIG. 1, user may place tiles on canvas 150, so that the tiles may be organized to form a rule. For example, a user may move "Payment Date" tile 130 from library 110 to canvas 150, for example by dragging "Payment Date" tile 130 from the library 110 to the canvas 150.

Tiles may be collected in a free form manner, for example onto canvas 150, to define logic statements. These statements may correspond to one or more instructions capable of being executed by a computer to perform a business function. Users may move tiles onto canvas 150 individually or as a stack. Examples of stacks of tiles are all the properties of an object, all of the tiles needed for algebraic evaluation, or collections, such as most used language elements.

Canvas 150 provides the user with a convenient place to store business and logic concepts. A user may place any tile on canvas 150 even if it is not used in a rule. Users may then arrange and re-arrange tiles to assemble tiles into logical statements, giving concepts definite meanings. A user may arrange tiles using "cards," which are described in more detail below.

Canvas 150 includes exemplary cards 160, 170, and 180. Cards 160, 170, and 180 may use the familiar metaphor of a dictionary for expressing specific logic in natural language. Cards 160, 170, and 180 hold the defined logic for a given property or valued value. Cards 160, 170, and 180 may be defined for rules that take action, define how to compute a business concept, or process an event, for example. Cards 160, 170, and 180 include a description in natural language, and a section where the definition of the rules is completed. Cards 160, 170, and 180 may include other sections. A user may easily move language elements, such as tiles, complex logic blocks, and variable definitions, to other areas on canvas 150 to reduce the complexity of cards 160, 170, and 180.

The complexity behind the humanized logic may be revealed in a way that helps a business analyst understand how the system will function. A user may examine a rule by "zooming" in to a more complex view. Each step may make the logic area more verbose with details, technical representation, and syntax.

For example, if the user is viewing the most simple logic, the user may choose to view more detail, and variable definitions may be moved (e.g., temporarily) onto the logic area of a card, giving a more complete representation of the code, Revealing more, a user may see hidden syntax, or the actual code of the language.

Cards 160, 170, and 180 may be unique to a type of data that is returned for a concept. For example, for a concept that is Boolean in nature (e.g., that returns true or false) the card may only need a definition of the true value. Statements on the card may be combined in a logical "or" manner, just as if they were declared in a dictionary. If a logical "and" is necessary, then it may be explicitly stated within the card. Logic on the cards may be declarative or procedural.

Logic on the cards may read like plain natural language (e.g., English), with friendly naming conventions and a reduced use of symbols. As discussed above, a user may zoom in to view a more detailed version of a rule.

Much of the syntax needed for a valid computer programming statement is implied in the layout of the card. For example, brackets may be implied around the initial definition of logic. Other visual representations may be used to denote order of execution, and comments may be hidden on the card with familiar notations. In one example, when a logic statement is complete as a valid rule, live feedback is provided for the user. Feedback may include, for example, a visual image in the canvas representing that the first selected tile and the second selected tile are not compatible. Alternatively or additionally, the feedback may include repelling a selected tile from another selected tile. Cards 160, 170, and 180 include a definition of a rule using tiles that have been placed on the canvas, as described in more detail below with respect to FIGS. 2-4.

Figure 2:
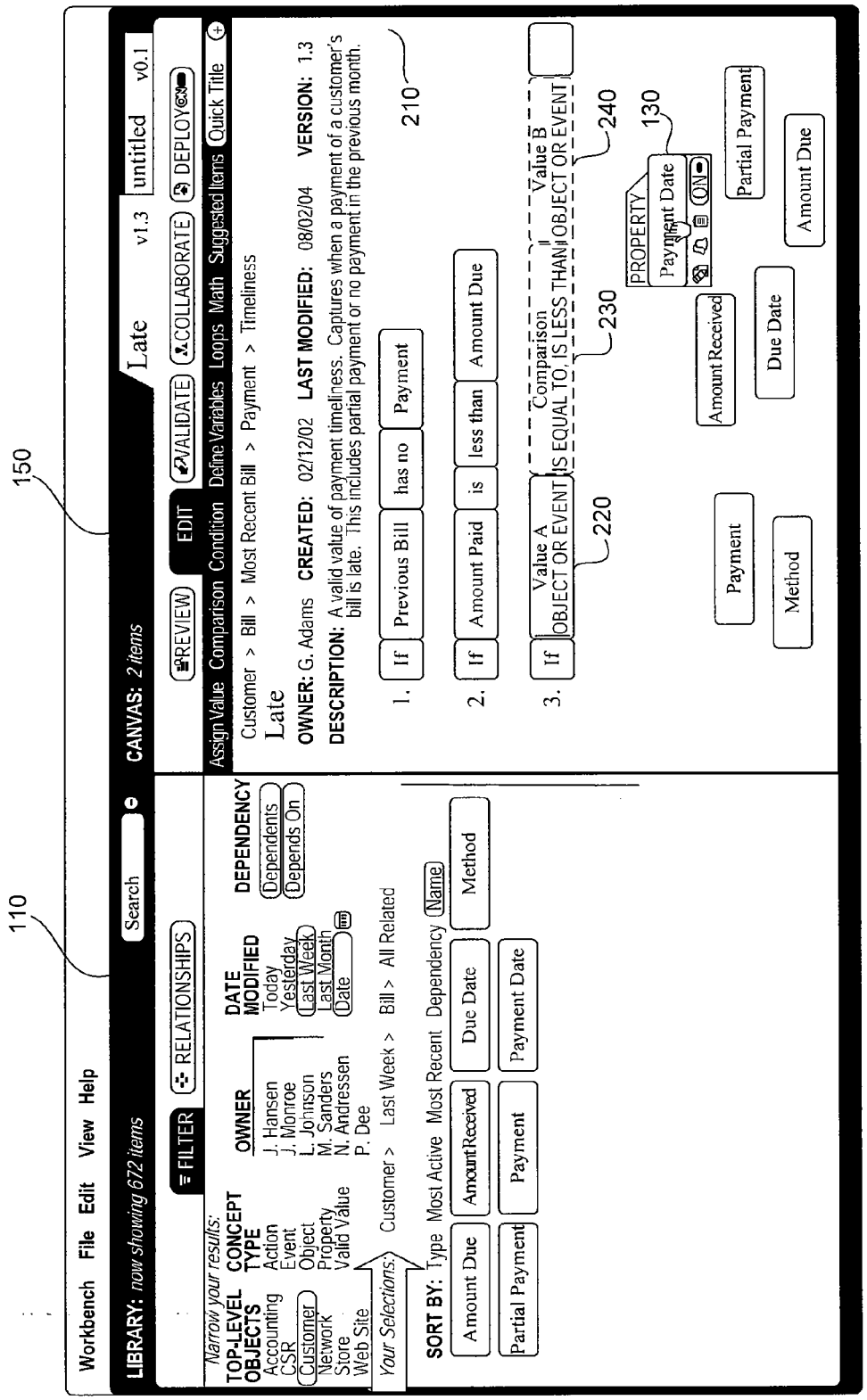
FIG. 2 is a diagram of a user interface for creating a business rule using a workspace in accordance with one implementation consistent with the present invention.

As shown in FIG. 2, canvas 150 includes a construction area 210, where a user assembles tiles into logic. Tiles can be moved within canvas 150 to a specific line of logic for concrete rule definition. For example, canvas 150 includes a logic blocks 220, 230, or 240. A user may move tile 130 from canvas 150 to one of logic blocks 220, 230, or 240 within construction area 210 to create a card.

Figure 3:
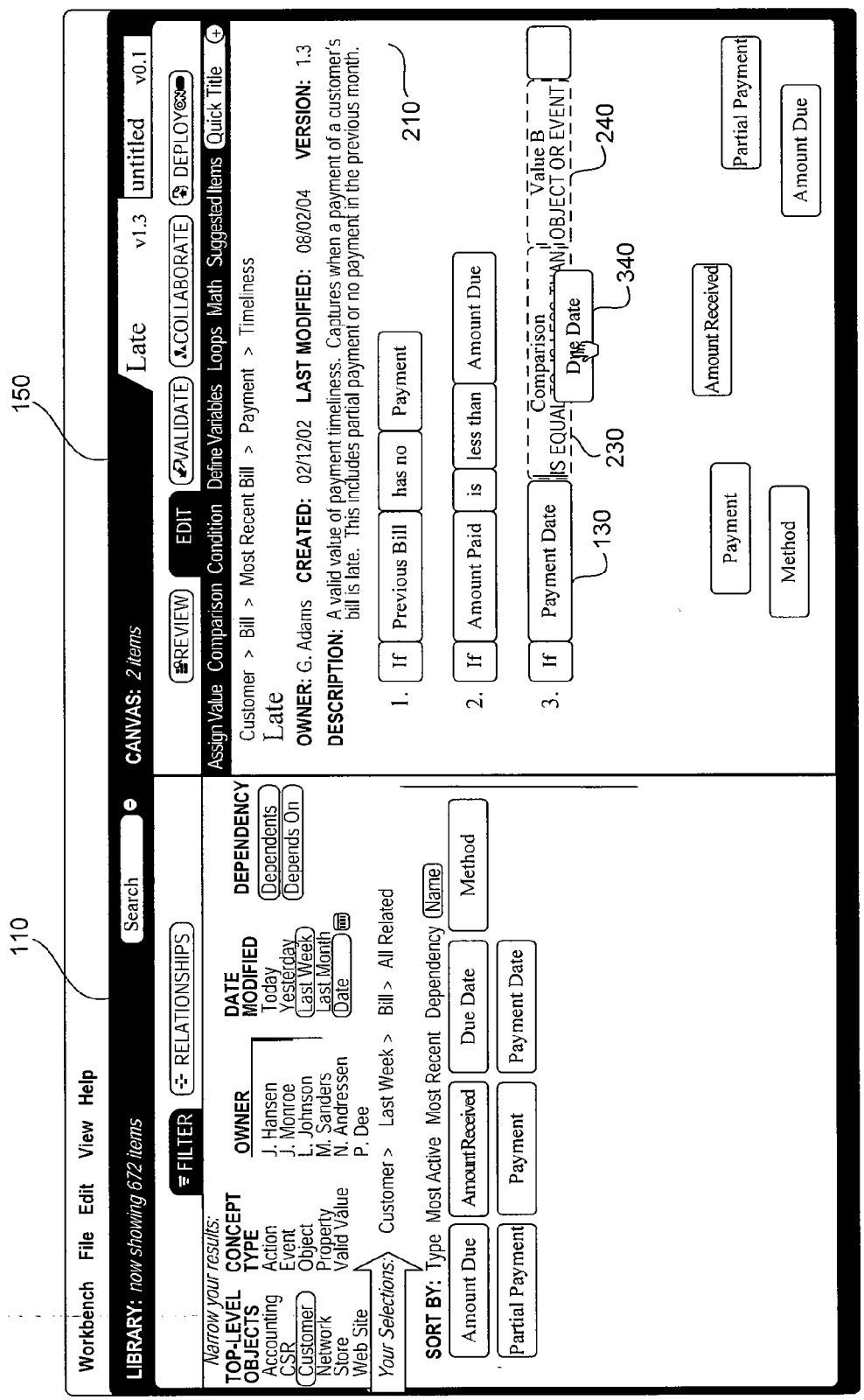
FIG. 3 is a diagram of a user interface for managing a business rule using a workspace in accordance with one implementation consistent with the present invention.

Tiles may possess magnetic qualities with intelligence. They may attract tiles that will logically go together to construct valid business rules and will repel tiles that should not be logically combined. As shown in FIG. 3, a tile, such as "Due Date" tile 340, may repel from another tile, such as tile 130, if the two tiles are not logically consistent. As the two tiles repel, live visual feedback may be given to the user to indicate that the two tiles do not belong together, as described in more detail below with respect to FIG. 4.

Figure 4:
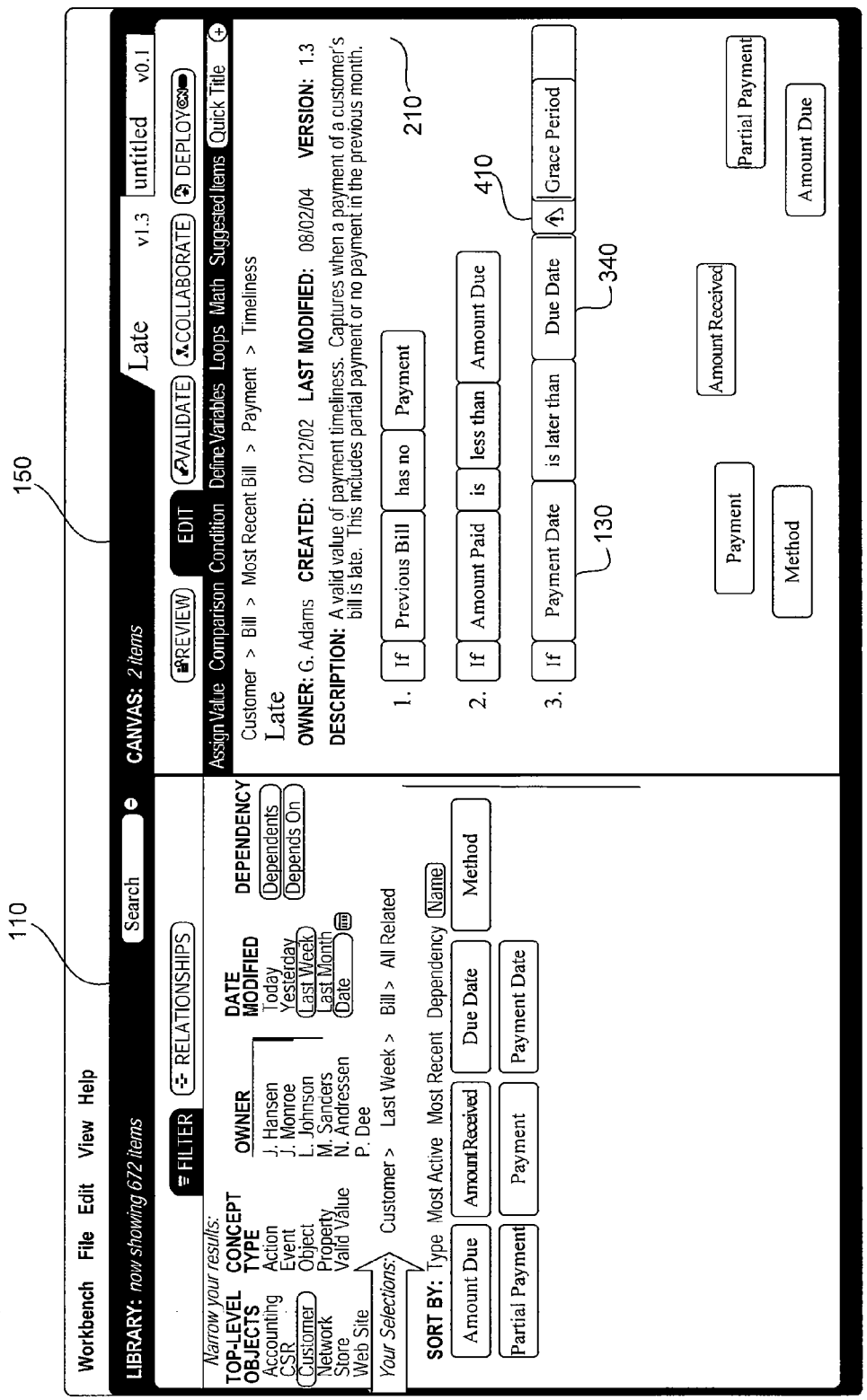
FIG. 4 is a diagram of a user interface for organizing a business rule using a workspace in accordance with one implementation consistent with the present invention.

Similarly, as shown in FIG. 4, feedback, such as warning 410, may be displayed when a user attempts to place two tiles together that do not belong together, such as trying to compare a date to a dollar value. If two tiles repel, canvas 150 may output suggestions for tiles that will tie the two repelled tiles together. Suggestions may be narrowed to those options that logically tie certain concepts together.

When two tiles attract (not shown), canvas 150 may indicate that the two tiles can logically be placed by one another. For example, the tiles may provide live feedback (e.g., a visual image, a statement, two tiles repelling or attracting, a warning, an audio message, highlighting, etc.) when brought together.

In certain examples, tiles may be combined and moved to another section (e.g., a references section, not shown) leaving a new natural language label to simplify readability of logic.

Canvas 150 may, in some examples, be automatically populated with relevant tiles. For example, tiles representing the properties of an object being worked on may automatically be places on canvas 150, eliminating the need for a user to search for tiles. As another example, when a user includes a language construct such as "IF", canvas 150 may automatically include a "THEN" tile.

Figure 5:
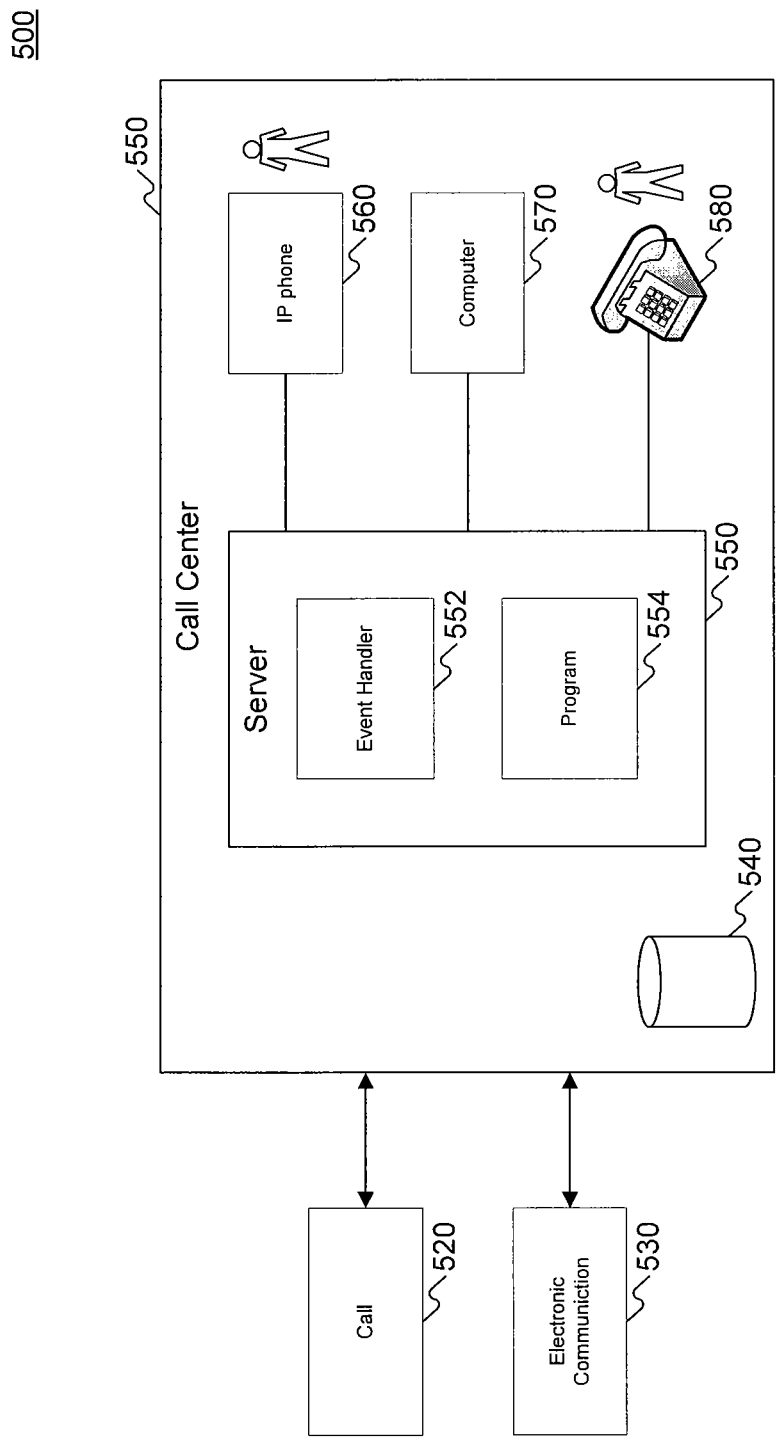
FIG. 5 is a diagram of a system for handling event data in which systems and methods consistent with aspects of the present invention may be implemented.

FIG. 5 is a diagram of an exemplary system for handling event data in which systems and methods consistent with aspects of the present invention may be implemented. The components and arrangement of FIG. 5, however, may be varied within principles of the present invention.

As shown in FIG. 1, system 500 includes call center 510. Call center 510 may receive event data such as a call 520 or an electronic communication 530. For example, a customer may contact call center 510 via call 520 or electronic communication 530 to inquire about a bill. Electronic communication 530 may include, for example, an e-mail, a text message, a voice-over IP communication, an audio-visual communication, or a notification from another computer system (not pictured), such as a notification that a bill was delivered to a customer.

Similarly, call center 510 may output event data such as call 520 or electronic communication 530. For example, call center 510 may call a customer to preempt a question about a bill, or may send electronic communication 530 (e.g., an email) to update a customer about the status of a bill. In certain examples, any customer activity (e.g., payment of a bill, change of address, etc.) may result in an electronic communication 530 to call center 510.

As shown in FIG. 5, call center 510 includes data store 540, server 550, IP phone 560, computer 570, and telephone 580. Data store 540 may comprise one or more databases that store information and are accessed and/or managed through system 500. By way of example, data store 540 may be an Oracle™ database, a Sybase™ database, or other relational database system. Data store 540 may store, for example, data and information related to call 520, electronic communication 530, events, notifications, customer information, etc. Systems and methods of the present invention, however, are not limited to separate databases or even to the use of a database.

Server 550 may include event handler 552 and program 554. Event handler 552 may monitor and handle events, such as call 520 or electronic communication 530. For example, event handler 552 may monitor customer activity, such as any changes in customer data, changes in customer environment either initiated by a company or initiated by a customer, changes in the configuration of a product or service, changes in the patterns of use of a product or service, or communication between the company and the customer. Program 554 may comprise any software application configured to work with event handler 552, for example. In one example, program 554 may comprise a forward-chained rule engine to process a rule. Server 550 may also include other programs that perform other functions and processes, such as programs that provide communication support and customer activity monitoring.

IP Phone 560 may comprise a voice over Internet Protocol (VoIP) system. Computer 570 may comprise one or more workstations, personal computers, laptops, or other computers. Telephone 580 may comprise one or more standard telephones. IP Phone 560 and computer 570 may implement the user interfaces described above with respect to FIGS. 1-4, for example.

A software developer or business user may build business rules using an intelligent tiles-based interface system as disclosed herein, and a call center (sometimes with the help of an operator) may process customer calls in accordance with the business rules. Alternatively, the intelligent tiles interface system may be used to develop business rules for use in other aspects associated with running a business, such as a company payroll system, a human resources system, etc.

Other features will be apparent to those skilled in the art from consideration of the specification and examples disclosed herein. It is intended that the specification and examples be considered as exemplary only.

What is claimed is:

1. A computer-implemented rule construction method for configuring rules in a computer system having a memory and a display screen, the method comprising:
    enabling simultaneous display of multiple windows on the display screen, the multiple windows including a first window configured as a library and a second window configured as a canvas;
    enabling custom configuration of tiles in the library, each tile corresponding to a term;
    enabling selection of a set of tiles from the library for placement in a region of the canvas,
    wherein the placement reflects a logical statement, and further wherein the set of tiles is displayed in accordance with a first view level; and
    enabling examination of additional information associated with the set of tiles placed in the region of the canvas by accessing a second view level of the canvas,
    wherein the additional information is displayed in the region of the canvas.

2. The method of claim 1, further comprising:
    comparing a first selected tile with a second selected tile;
    determining if the first selected tile and the second selected tile are compatible; and
    providing feedback representing the determination.

3. The method of claim 2, wherein the feedback is a visual image in the canvas representing that the first selected tile and the second selected tile are not compatible.

4. The method of claim 2, wherein the comparing is performed within a predetermined construction area on the canvas.

5. The method of claim 2, wherein the feedback includes repelling the second selected tile from the first selected tile.

6. The method of claim 1, wherein the tiles include natural language labels.

7. The method of claim 1, further comprising receiving terms from a user.

8. A rule construction system for configuring rules, the system comprising:
    a memory;
    a display screen configured to enable simultaneous display of multiple windows on the display screen, the multiple windows including a first window configured as a library and a second window configured as a canvas;
    a library configuration component configured to enable custom configuration of tiles in the library, each tile corresponding to a term; and
    a placement component configured to enable selection of a set of tiles from the library for placement in a region of the canvas, wherein the placement reflects a logical statement,
    wherein the set of tiles is displayed in accordance with a first view level,
    wherein the placement component is further configured to enable examination of additional information associated with the set of tiles placed in the region of the canvas by accessing a second view level of the canvas, and
    wherein the additional information is displayed in the region of the canvas.

9. The system of claim 8, wherein the placement component is configured to:

compare a first selected tile with a second selected tile;

determine if the first selected tile and the second selected tile are compatible; and provide feedback representing the determination.

10. The system of claim 9, wherein the feedback is a visual image in the canvas representing that the first selected tile and the second selected tile are not compatible.

11. The system of claim 9, wherein the feedback includes repelling the second selected tile from the first selected tile.

12. The system of claim 8, further comprising a receiving component configured to receive terms from a user.

13. The system of claim 8, wherein the tiles include natural language labels.

14. The system of claim 8, further comprising a data store including a map of relationships between terms.

15. A computer-implemented rule construction method for configuring a business rule for a customer's bill payment pattern in a computer system having a memory and display, the method comprising:

enabling simultaneous display of multiple windows on the display screen, the multiple windows including a first window configured as a library and a second window configured as a canvas;

enabling custom configuration of tiles in the library, each tile corresponding to a business term;

enabling selection of a first tile and a second tile from the library for placement in a region of the canvas, wherein the placement reflects a configuration of the business rule for the customer's bill payment pattern, and further wherein the set of tiles is displayed in accordance with a first view level; and enabling examination of additional information associated with the first tile and the second tile placed in the region of the canvas by accessing a second view level of the canvas, wherein the additional information is displayed in the region of the canvas.

16. The method of claim 15, further comprising:

comparing the first tile with the second tile;

determining if the first tile and the second tile are compatible based on business terms corresponding to the first tile and the second tile; and providing feedback representing the determination.

17. The method of claim 16, wherein the feedback is a visual image in the canvas representing that the first tile and the second tile are not compatible.

18. The method of claim 16, wherein the feedback includes repelling the second selected tile from the first selected tile.

19. The method of claim 15, wherein the tiles include natural language labels.

20. The method of claim 1, further comprising a map of relationships between business terms.

21. The method of claim 1, wherein the logical statement corresponds to one or more instructions capable of being executed by a computer to perform a business function.

* * * * *